(12) United States Patent
Lim et al.

(10) Patent No.: US 7,869,341 B2
(45) Date of Patent: Jan. 11, 2011

(54) METHOD AND APPARATUS FOR POSITIONING PILOT IN AN OFDMA MOBILE COMMUNICATION SYSTEM

(75) Inventors: Yeon-Ju Lim, Seoul (KR); Jae-Chon Yu, Suwon-si (KR); Hwan Joon Kwon, Suwon-si (KR); Dong-Hee Kim, Yongin-si (KR); Yu-Chul Kim, Seoul (KR); Jin-Kyu Han, Seoul (KR); Stefan Schiffermuller, Berlin (DE); Aydin Sezgin, Berlin (DE); Anastasios Giovanidis, Berlin (DE)

(73) Assignee: Samsung Electronics Co., Ltd. (KR)

( * ) Notice: Subject to any disclaimer, the term of this patent is extended or adjusted under 35 U.S.C. 154(b) by 480 days.

(21) Appl. No.: 11/828,698

(22) Filed: Jul. 26, 2007

(65) Prior Publication Data

US 2008/0068980 A1 Mar. 20, 2008

(30) Foreign Application Priority Data

Jul. 28, 2006 (KR) ............... 10-2006-0071732
Aug. 1, 2006 (KR) ............... 10-2006-0072782

(51) Int. Cl.
*H04J 11/00* (2006.01)
*H04J 9/00* (2006.01)
*H04B 1/00* (2006.01)
(52) U.S. Cl. .................. 370/208; 370/204; 375/130
(58) Field of Classification Search ........ 370/203, 370/208; 375/130
See application file for complete search history.

(56) References Cited

U.S. PATENT DOCUMENTS

| 6,654,429 | B1 | 11/2003 | Li | |
|---|---|---|---|---|
| 6,996,195 | B2 | 2/2006 | Kadous | |
| 7,012,882 | B2 | 3/2006 | Wang et al. | |
| 2006/0018394 | A1* | 1/2006 | van Zelst et al. | 375/260 |
| 2006/0120270 | A1* | 6/2006 | Han et al. | 370/208 |
| 2006/0285479 | A1* | 12/2006 | Han et al. | 370/203 |
| 2007/0133386 | A1* | 6/2007 | Kim et al. | 370/203 |
| 2007/0195899 | A1* | 8/2007 | Bhushan et al. | 375/260 |

OTHER PUBLICATIONS

Chen, Shaoping, et al., Intercarrier Interference Suppression and Channel Estimation for OFDM Systems in Time-varying Frequency-selective Fading Channels, IEEE, May 2004, IEEE Transactions on Consumer Electronics, vol. 50, Issue 2, pp. 429-435.*

(Continued)

*Primary Examiner*—Ricky Ngo
*Assistant Examiner*—Paul Masur
(74) *Attorney, Agent, or Firm*—The Farrell Law Firm, LLP

(57) ABSTRACT

An apparatus and method for positioning a pilot in a transmitter for an Orthogonal Frequency Division Multiple Access (OFDMA) mobile communication system. In the apparatus, a consecutive block assignment determiner determines whether it will assign a consecutive block or a single block in a frequency axis or a time axis. A pilot tone pattern generator determines a pilot pattern in the block by applying a predetermined rule according to the determination result. A pilot tone inserter positions pilots in the block based on the determined pilot pattern.

28 Claims, 12 Drawing Sheets

OTHER PUBLICATIONS

Hu, Die, et al., Optimal pilot sequence design for multiple-input multiple-output OFDM systems, IEEE, Dec. 2005, Global Telecommunications Conference, 2005, Globecom '05, vol. 4, PChenage(s): 1-5.*

Zhao, Xueyuan, et al., A Comparative Analysis of Pilot Placement Schemes in Frequency-selective Fast Fading Mimo Channel, IEEE, Apr. 26-28, 20007, Wireless Telecommunications Symposium, 2007, pp. 1-7.*

* cited by examiner

■ PILOT TONES
▨ PILOT TONES WITH REDUCED PDR
☐ DATA TONES

METHOD AND APPARATUS FOR POSITIONING PILOT IN AN OFDMA MOBILE COMMUNICATION SYSTEM

PRIORITY

This application claims priority under 35 U.S.C. §119(a) to a Korean Patent Applications filed in the Korean Intellectual Property Office on Jul. 28, 2006 and assigned Serial No. 2006-71732 and filed on Aug. 1, 2006 and assigned Serial No. 2006-72782, the disclosure of each of which is incorporated herein by reference.

BACKGROUND OF THE INVENTION

1. Field of the Invention

The present invention relates generally to an Orthogonal Frequency Division Multiple Access (OFDMA) mobile communication system, and in particular, to a method and apparatus for positioning pilots in an OFDMA mobile communication system.

2. Description of the Related Art

Recently, in mobile communication systems, intensive research and development is being conducted on Orthogonal Frequency Division Multiplexing (OFDM) as a useful scheme for high-speed data transmission over wire/wireless channels. OFDM, a scheme for transmitting data using multiple carriers, is a type of Multi-Carrier Modulation (MCM) that converts a serial input symbol stream into parallel symbol streams and modulates each of the parallel symbol streams with multiple orthogonal sub-carriers, or multiple sub-carrier channels, before transmission.

The system employing MCM was first applied to military communications in the late 1950s, and OFDM that overlaps multiple orthogonal sub-carriers, even though it has developed from the 1970s, has had a limitation in its application to the actual system because of the implementation difficulty of orthogonal modulation between multiple carriers. However, since Weinstein et al. submitted in 1971 that OFDM-based modulation/demodulation enables efficient processing using Discrete Fourier Transform (DFT), technology development for OFDM has been rapidly carried out. In addition, as OFDM uses a guard interval and a scheme of inserting a Cyclic Prefix (CP) symbol in the guard interval is known, the negative influences on the system for multiple paths and delay spread have remarkably been reduced.

Owing to the technical development, the OFDM technology is being broadly applied to digital transmission technologies such as Digital Audio Broadcasting (DAB), Digital Video Broadcasting (DVB), Wireless Local Area Network (WLAN), Wireless Asynchronous Transfer Mode (WATM), etc. However, OFDM could not be broadly used due to its hardware complexity, but its realization is now possible with the recent development of various digital signal processing technologies including Fast Fourier Transform (FFT) and Inverse Fast Fourier Transform (IFFT). OFDM, though it is similar to the conventional Frequency Division Multiplexing (FDM), maintains orthogonality between multiple sub-carriers during transmission, thereby obtaining optimal transmission efficiency during high-speed data transmission. OFDM, as it has high frequency utilization efficiency and is robust against multi-path fading, can obtain optimal transmission efficiency during high-speed data transmission. In addition, OFDM, because it overlaps the frequency spectra, has high frequency utilization efficiency and is robust against frequency selective fading and multi-path fading. Further, OFDM can reduce an Inter-Symbol Interference (ISI) effect using the guard interval, and can simply be utilized in the design of an equalizer. Moreover, OFDM, as it is robust against impulse noise, tends to be used for communication systems.

In wireless communication systems, the high-speed, high-quality data services are generally impeded by the channel environment. The channel environment frequently varies not only due to Additive White Gaussian Noise (AWGN) but also due to power variation of a received signal, caused by fading, shadowing, a Doppler effect based on movement and frequent velocity change of a terminal, interference by other users and multi-path signals, etc. Therefore, there is a need to efficiently overcome the impediment factors in order to support the high-speed, high-quality data services in wireless communications.

FIG. 1 is a diagram illustrating pilot positioning in a conventional block having 8 OFDM symbols in a time domain and 15 tones in a frequency domain.

In OFDM, a modulation signal is located in 2-dimensional resources composed of time and frequency. Resources on the time axis are divided into different OFDM symbols, and resources on the frequency axis are divided into different sub-carriers, which are orthogonal to each other.

As shown in FIG. 1, data symbols are transmitted over uncolored (or white) tones, and pilot symbols are transmitted over colored (or black) tones. In addition, the pilot symbols are transmitted at intervals of 7 frequency tones (d=7) in the frequency domain. When the pilot symbols are transmitted at regular intervals, a data symbol demodulation performance after channel estimation at a receiver, is increased, as compared to when the pilot symbols are transmitted at irregular intervals. For example, in FIG. 1, pilots are positioned in $1^{st}$, $8^{th}$ and $15^{th}$ sub-carriers on the frequency axis. To receive data positioned in $2^{nd}$ to $7^{th}$ sub-carriers, the receiver estimates a channel through interpolation using the $1^{st}$ and $8^{th}$ pilot symbols, and demodulates the data. Similarly, to receive data positioned in $9^{th}$ to $14^{th}$ sub-carriers, the receiver estimates a channel through interpolation using the $8^{th}$ and $15^{th}$ pilot symbols, and demodulates the data. Unlike FIG. 1, if pilots are positioned in $1^{st}$, $4^{th}$ and $15^{th}$ sub-carriers on the frequency axis, demodulation performance for $2^{nd}$ and $3^{rd}$ data symbols may increase with the use of channel estimation on $1^{st}$ and $4^{th}$ pilot symbols, but data symbols positioned between $4^{th}$ and $15^{th}$ pilot symbols may suffer from a decrease in the channel estimation performance due to the long pilot interval, causing a possible decrease in the entire data demodulation performance. That is, if the pilots are transmitted at irregular intervals, the channel estimation performance decreases for the data symbols located between the pilots transmitted at the longer interval, causing a reduction in a data reception rate. Therefore, a pilot positioning scheme is used in which an interval between pilot symbols is regular in the frequency domain.

FIG. 2 is a diagram illustrating pilot positioning in a conventional block having 8 OFDM symbols in a time domain and 16 tones in a frequency domain, and FIG. 3 is a diagram illustrating pilot positioning in a conventional block having 8 OFDM symbols in a time domain and 8 tones in a frequency domain.

Shown in FIG. 2 is a block having 8 OFDM symbols in the time domain and 16 tones in the frequency domain. As pilot tones for channel estimation are selected at intervals of 7 pilot tones in the frequency domain, an interval (or distance) d between the pilots is 7, so the interval between the pilot tones in the frequency domain is constant. However, for the time domain, the remaining tones except for 2 tones located in the center are all used.

This block becomes a hopping unit for resource assignment in the OFDMA mobile communication system, and the system transmits data and pilots while hopping the entire frequency band in units of blocks over the passage of time.

A size of the block used in FIG. 3 is ½ that of the size of the block shown in FIG. 2 on the frequency axis, and an interval between pilot symbols in the frequency domain is d=3. The format of FIG. 3 can be used only when an FFT size is less than 512, and because its d value is relatively small, this block is effective for large delay spread.

In FIGS. 2 and 3, because the interval between pilot symbols in the frequency domain is regular as in the conventional technology, the bottom tones of the block are not used for transmitting pilot symbols. That is, data symbols are transmitted over the bottom frequency tones of the block. Therefore, for channel estimation for the bottom frequency tones, extrapolation should be performed using the pilot symbols located in the just upper level of the bottom. Compared to the interpolation that uses pilot symbols located in both ends of the data symbols, the extrapolation may cause a reduction in the channel estimation performance.

SUMMARY OF THE INVENTION

An aspect of the present invention is to address at least the above problems and/or disadvantages and to provide at least the advantages described below. Accordingly, an aspect of the present invention is to provide a pilot positioning method and apparatus for transmitting pilot symbols over frequency tones located in both ends of a block in an OFDMA mobile communication system.

Another aspect of the present invention is to provide a pilot positioning method and apparatus for setting an irregular interval between pilot symbols in one block to transmit pilot symbols over frequency tones located in both ends of a block in an OFDMA mobile communication system, thereby removing the necessity to perform extrapolation upper level interpolation.

Another aspect of the present invention is to provide a pilot positioning method and apparatus for reducing overhead of pilot symbols by reducing a portion or power occupied by pilot symbols in a block when consecutive blocks on the time axis or frequency axis are assigned to one user in an OFDMA mobile communication system.

Another aspect of the present invention is to provide a pilot positioning method and apparatus for reducing overhead of pilot symbols by reducing a portion or power occupied by pilot symbols in a block when a single block on the time axis or frequency axis is assigned to one user in an OFDMA mobile communication system.

According to one aspect of the present invention, there is provided a method for positioning a pilot in a transmitter for an Orthogonal Frequency Division Multiple Access (OFDMA) mobile communication system. The pilot positioning method includes determining whether consecutive blocks or a single block will be assigned in a frequency axis or a time axis; determining a pilot pattern in the block by applying a predetermined rule according to the determination result; and positioning pilots in the block with the determined pilot pattern.

According to another aspect of the present invention, there is provided a method for estimating a pilot in a receiver for an Orthogonal Frequency Division Multiple Access (OFDMA) mobile communication system. The pilot estimation method includes determining whether an assigned block is a consecutive block or a single block in a frequency axis or a time axis; recognizing a pilot pattern in the block to which a predetermined rule is applied according to the determination result; and extracting pilots using the recognized pilot pattern.

According to further another aspect of the present invention, there is provided an apparatus for positioning a pilot in a transmitter for an Orthogonal Frequency Division Multiple Access (OFDMA) mobile communication system. The pilot positioning apparatus includes a consecutive block assignment determiner for determining whether a consecutive block or a single block will be assigned in a frequency axis or a time axis; a pilot tone pattern generator for determining a pilot pattern in the block by applying a predetermined rule according to the determination result; and a pilot tone inserter for positioning pilots in the block with the determined pilot pattern.

According to yet another aspect of the present invention, there is provided an apparatus for estimating a pilot in a receiver for an Orthogonal Frequency Division Multiple Access (OFDMA) mobile communication system. The pilot estimation apparatus includes a consecutive block assignment determiner for determining whether an assigned block is a consecutive block or a single block in a frequency axis or a time axis; a pilot tone pattern recognizer for recognizing a pilot pattern in the block to which a predetermined rule is applied according to the determination result; and a pilot tone extractor for extracting pilots using the recognized pilot pattern.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness.

A pilot positioning method in an OFDMA mobile communication system according to the present invention removes the necessity to perform extrapolation upper level interpolation by setting an irregular interval between pilot symbols in one block to transmit pilot symbols over all frequency tones located in both ends of a block.

A first embodiment of the present invention provides a pilot positioning method for a case where a single block or consecutive blocks are assigned to one user on the frequency axis, a second embodiment of the present invention provides a pilot positioning method for a case where a single block or consecutive blocks are assigned to one user on the time axis.

Figure 4:
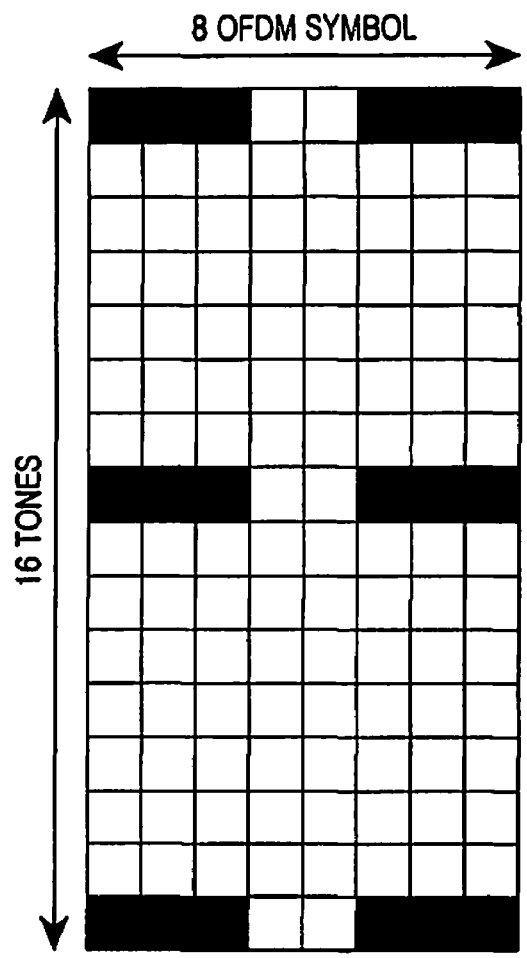
FIGS. 4 and 5 are diagrams illustrating pilot positioning in one block according to the present invention.
Figure 5:
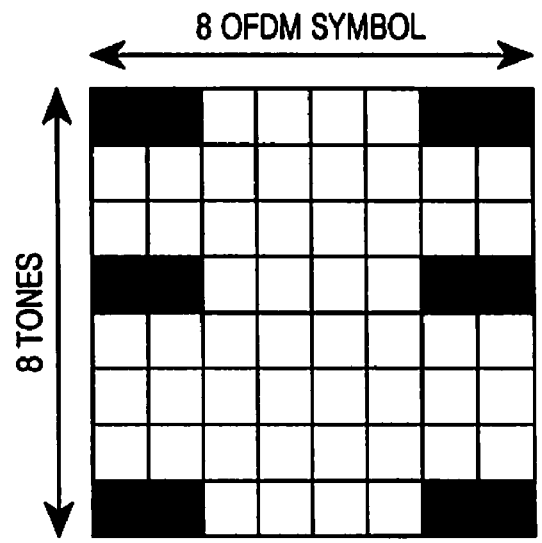

FIGS. 4 and 5 are diagrams illustrating pilot positioning in one block according to the present invention.

The present invention transmits pilot symbols over frequency tones located in both ends of a block. Compared to the conventional technology, the present invention has the same overhead, and its interval between pilot symbols in the frequency domain is not constant.

In FIG. 4, an interval between a $1^{st}$ pilot symbol and a $2^{nd}$ pilot symbol is set to $d_1=7$ on the frequency axis, and an interval between the $2^{nd}$ pilot symbol and a $3^{rd}$ pilot symbol is set to $d_2=8$ on the frequency axis.

In FIG. 5, an interval between a $1^{st}$ pilot symbol and a $2^{nd}$ pilot symbol is $d_1=3$, and an interval between the $2^{nd}$ pilot symbol and a $3^{rd}$ pilot symbol is $d_2=4$.

In this case, pilot symbols can be transmitted over the frequency tones located at both ends of a block, removing the necessity to perform extrapolation upper level interpolation, so gain improvement of a channel estimator can be achieved. The estimator gain herein indicates a difference between a Signal-to-Noise Ratio (SNR) obtained through initial estimation for pilot tones and an SNR plus gain after interpolation.

Figure 6:
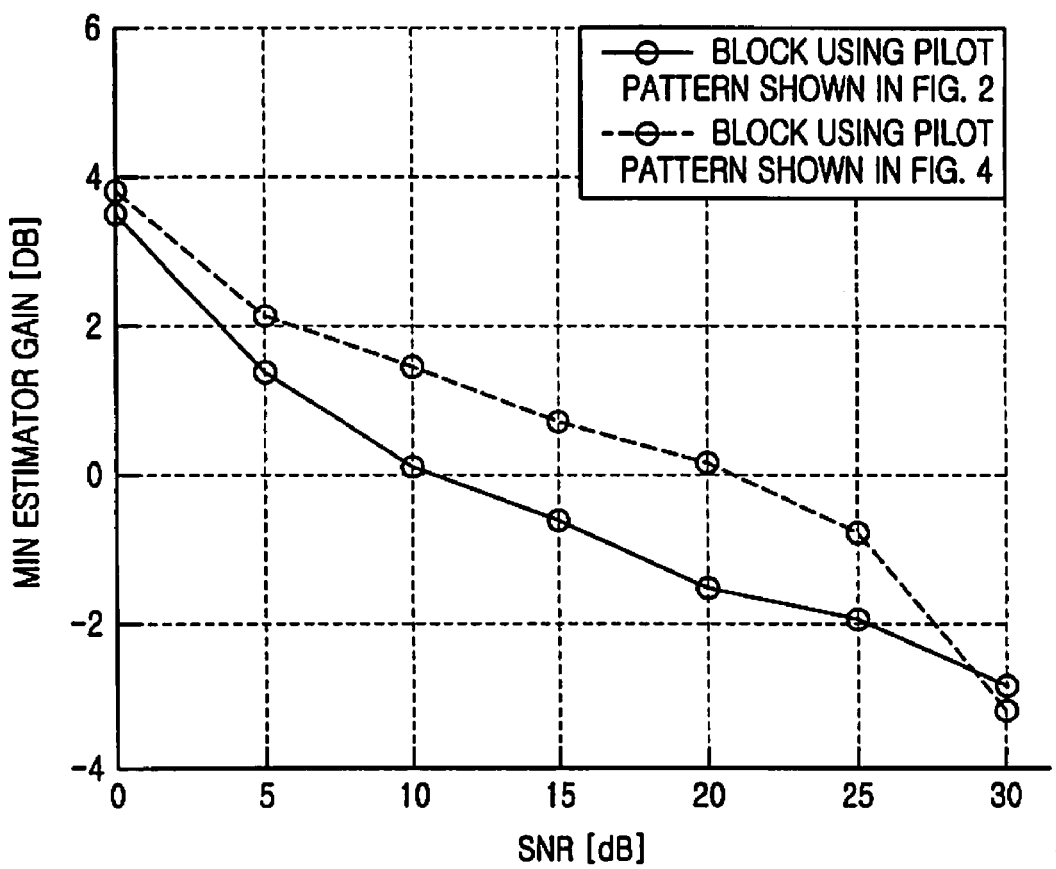
FIG. 6 is a graph illustrating an estimator gain.

FIG. 6 is a graph illustrating an estimator gain.

Shown in FIG. 6 indicates an estimator gain for frequency tones having a maximum Mean Square Error (MSE), when the number of sub-carriers is 2048, a length of a guard interval is 256, and 256 channel taps have the same average power.

Figure 1:
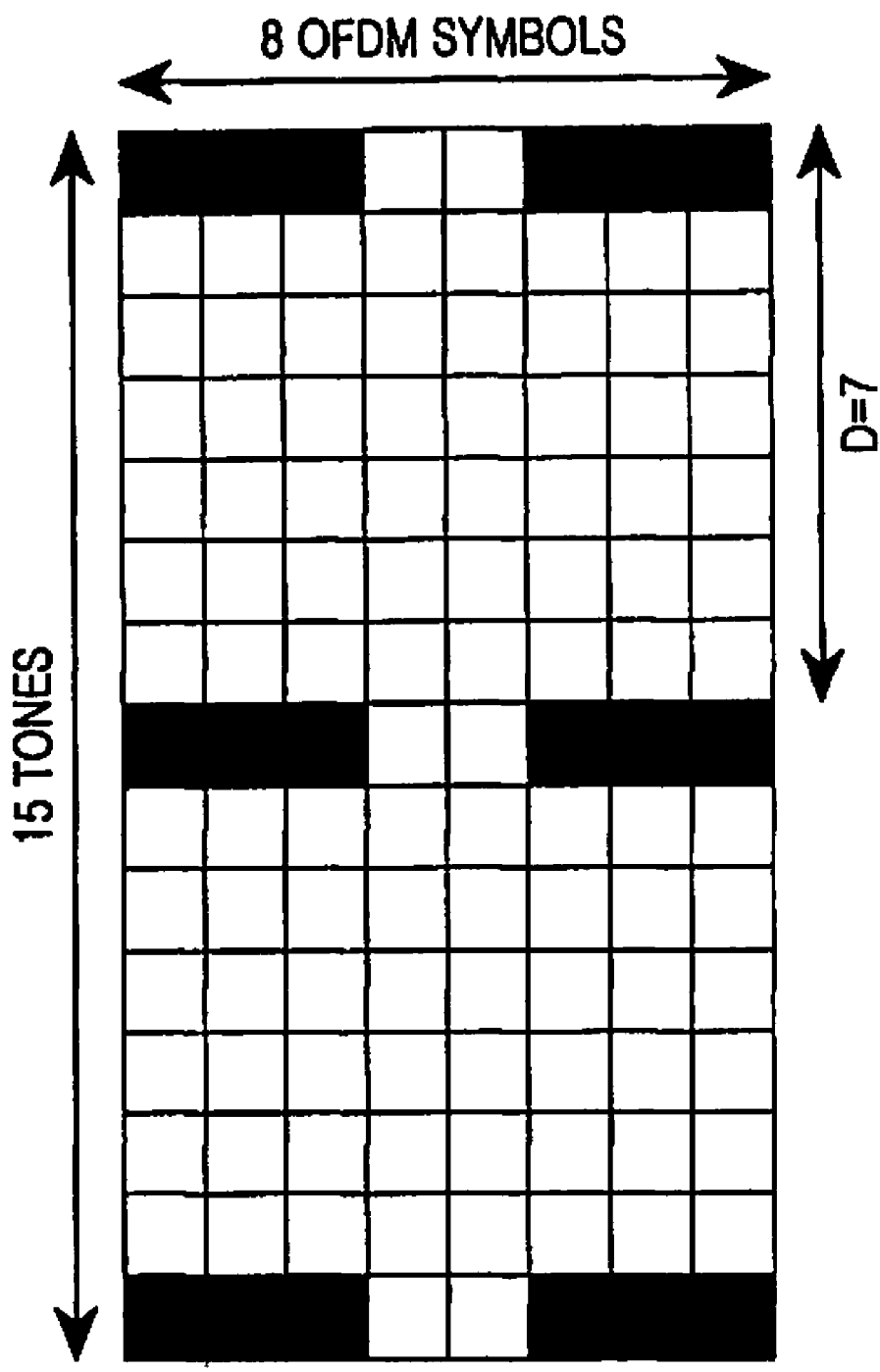
FIG. 1 is a diagram illustrating pilot positioning in a conventional block having 8 OFDM symbols in a time domain and 15 tones in a frequency domain.
Figure 2:
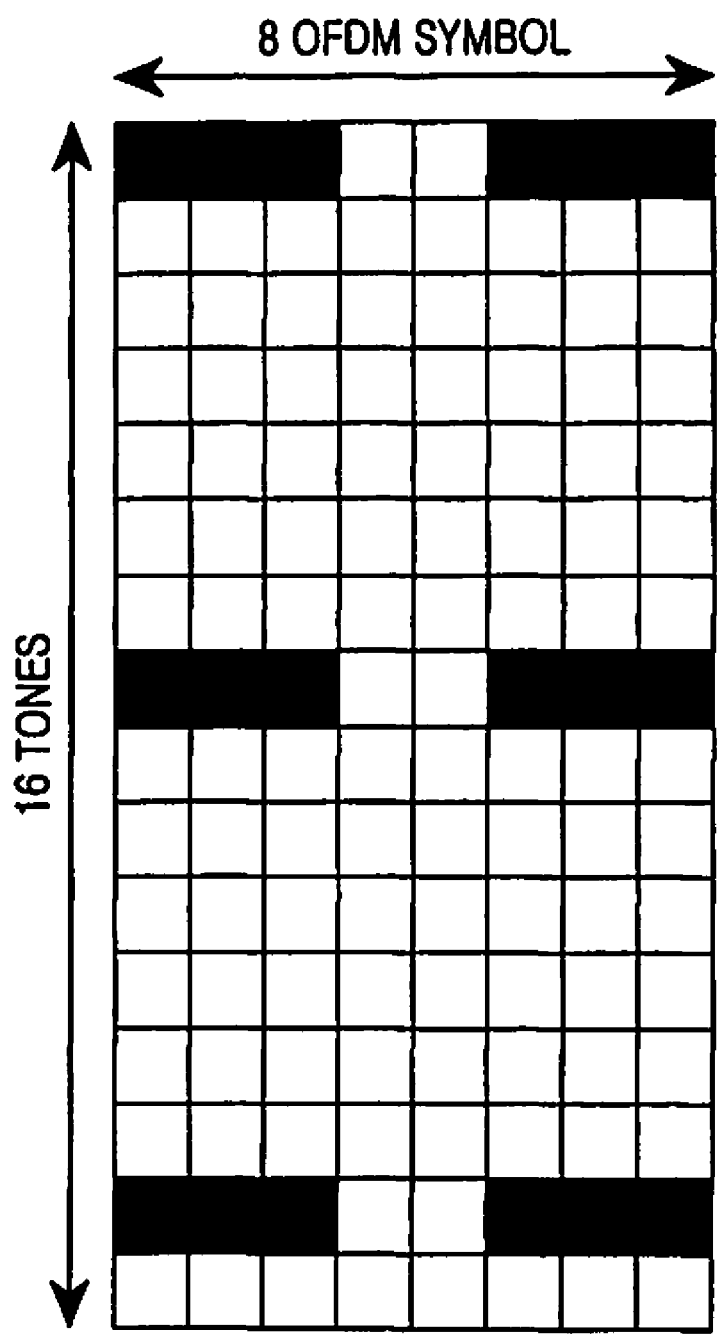
FIG. 2 is a diagram illustrating pilot positioning in a conventional block having 8 OFDM symbols in a time domain and 16 tones in a frequency domain.
Figure 3:
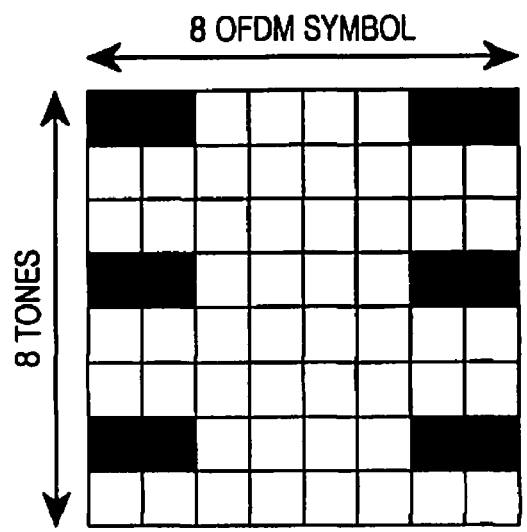
FIG. 3 is a diagram illustrating pilot positioning in a conventional block having 8 OFDM symbols in a time domain and 8 tones in a frequency domain.

It can be noted from the graph shown in FIG. 6 that compared to the block to which the pilot disposing shown in FIG. 2 is applied, the scheme shown in FIGS. 4 and 5 according to an embodiment of the present invention has much greater performance.

Figure 7:
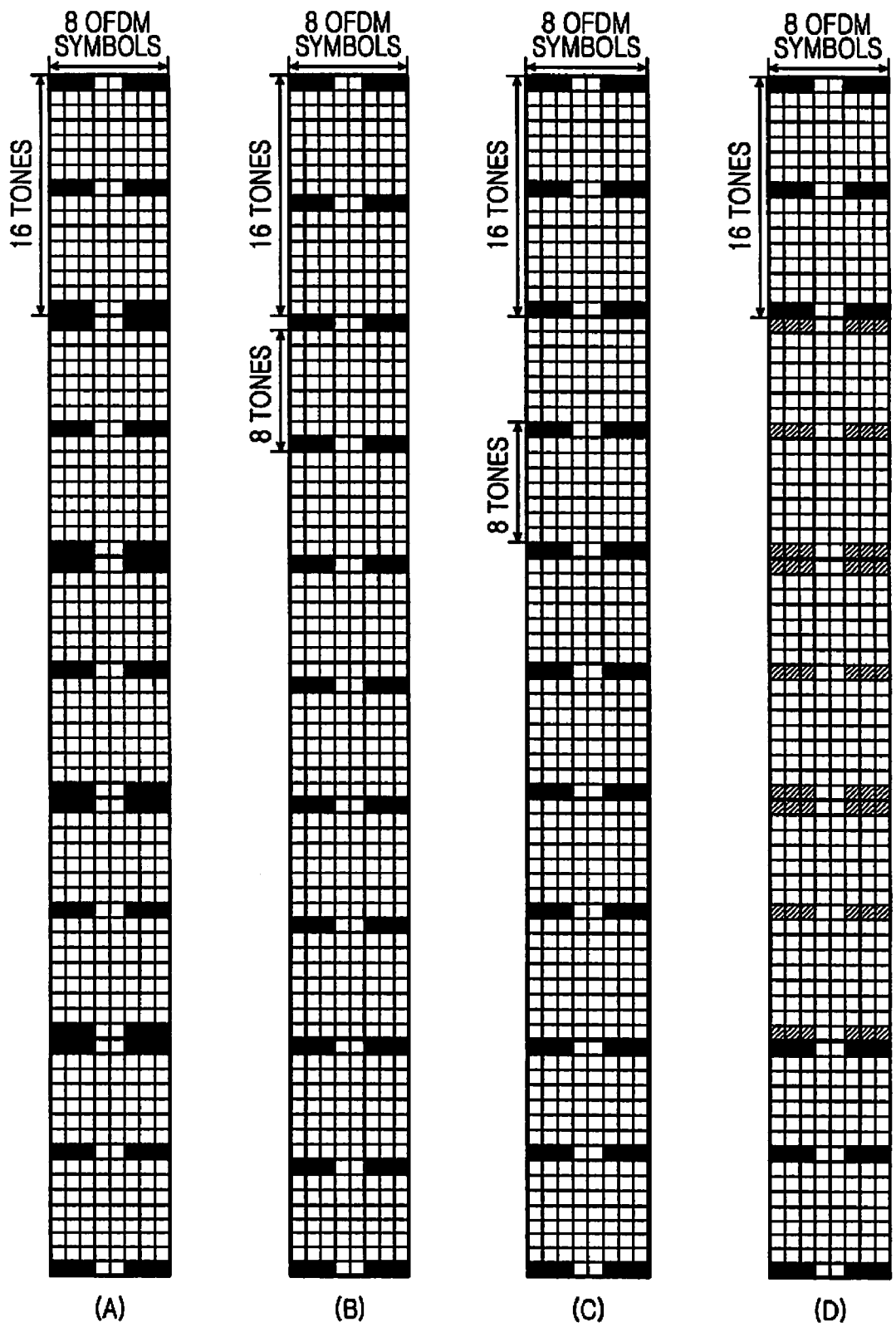
FIG. 7 is a diagram illustrating a pilot positioning method in an OFDMA mobile communication system according to a first embodiment of the present invention.

FIG. 7 is a diagram illustrating a pilot positioning method for a case where several adjacent blocks are simultaneously assigned to one user in an OFDMA mobile communication system according to a first embodiment of the present invention.

Shown in diagram (A) of FIG. 7 is a pilot positioning method of using several adjacent blocks based on the pilot pattern of FIG. 4 proposed for the case where a single block is assigned to one user according to the present invention.

As shown in diagram (A) of FIG. 7, when 5 consecutive blocks are assigned to one user in the frequency domain, each block keeps the pilot pattern during the single block assignment. Therefore, pilot tones in the boundary between the blocks are unhelpful to channel estimation and causes considerable pilot overhead. Similarly, even when the conventional pilot positioning of FIG. 2 of assigning a single block to one user is applied to the consecutive block assignment, the pilot tones in the boundary between the blocks increase the pilot overhead.

To reduce the overhead, the first embodiment of the present invention can apply the following rules, Rule 1 to Rule 5. The term 'mid-blocks' as used herein refers to the remaining blocks excluding a start block and an end block.

Rule 1

(1) An interval between pilots is defined as a number that can be obtained by dividing the number of frequency tones in one block.

(2) After pilots are positioned in all blocks at the pilot interval determined in (1), pilot symbol is positioned in frequency tone of an end of the last block.

Rule 2

(1) The pilot pattern with an irregular interval for single block based assignment is maintained in a start block and an end block.

(2) Pilot tones are positioned in mid-blocks in the manner described in Rule 1.

Rule 3

(1) The pilot pattern with an irregular interval for single block based assignment is applied for all blocks.

(2) The same pilot tone pattern is used for mid-blocks, with a Pilot-to-Data Ratio (PDR) value reduced.

Rule 4

Figure 8:
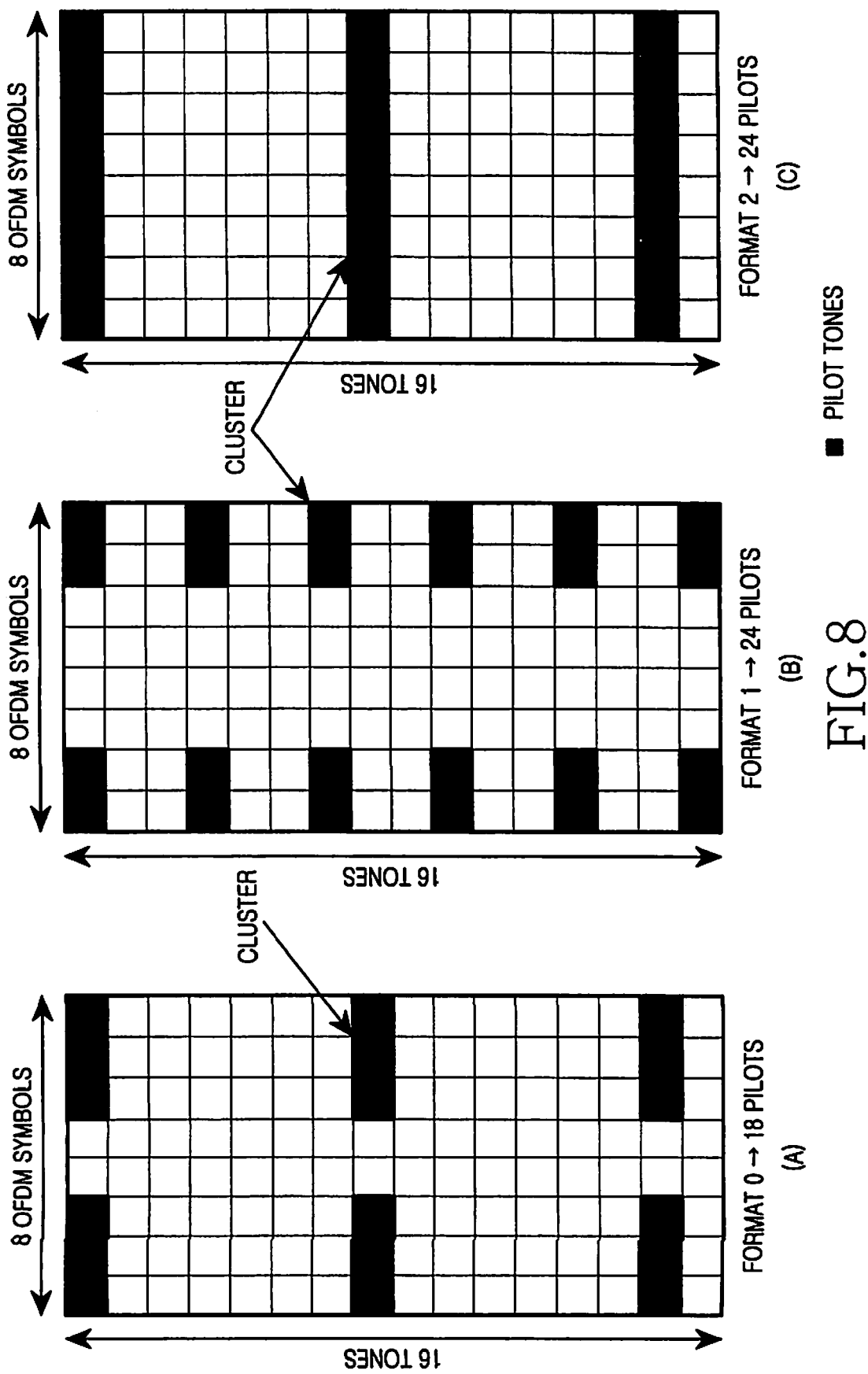
FIG. 8 is a diagram illustrating a pilot positioning method when several blocks are assigned in an OFDMA mobile communication system according to the first embodiment of the present invention.

(1) For several blocks assigned, when a pilot pattern uses one of Format 0 shown in diagram (A) of FIG. 8, Format 1 shown in diagram (B) of FIG. 8, and Format 2 shown in diagram (C) of FIG. 8, the pattern in the time axis of the original format is maintained.

(2) Pilots are positioned to have the same interval for the physically consecutive block while keeping the interval of the original format in the frequency axis.

Rule 5

(1) To simplify the implementation, Rule 4 is maintained when all blocks in one sub-band are assigned to a user.

(2) If only a partial block of one sub-band is assigned to one user, the original format is maintained for all assigned blocks.

The first embodiment of the present invention proposes to reduce pilot overhead by positioning pilot tones at a regular pilot tone interval d=8 using Rule 1 as shown in diagram (B) of FIG. 7. In Rule 1, the pilot tone interval 8 is a number that can be obtained by dividing the number 16 of all frequency tones in a block. However, in Rule 4 and Rule 5, the pilot tone interval should not necessarily be a number that can be obtained by dividing the number of all frequency tones. The pilot interval can be set to an arbitrary value such that a regular interval is given for all assigned blocks. To avoid extrapolation upper level interpolation, pilot symbols can be inserted and transmitted into/over the bottom frequency tones of the last block, but data symbols instead of the pilot symbols can be transmitted. That is, unlike the pilot positioning method of diagram (A) of FIG. 7 indicating the conventional assignment pattern of assigning consecutive blocks to one user, the pilot positioning method of diagram (B) of FIG. 7 sets a possible long interval between pilot tones in all blocks no matter whether the interval is regular or irregular, and disposes pilot tones at the set interval, thereby reducing pilot overhead in the boundary zone between the blocks. The pilot positioning method of diagram (C) of FIG. 7 sets the same pilot pattern of both end blocks in the frequency domain as the pattern in the single block assignment using Rule 2, and applies Rule 2 to change a pilot pattern of the blocks in the mid-zone.

Because the both end blocks are located in the edges in the frequency domain, it is not possible to use several blocks for channel estimation. To reduce a gain loss caused by the impossibility, the pilot positioning method applies the present invention proposed for single block assignment to the blocks located at both ends, thereby maintaining the block format with an irregular interval. In addition, the pilot positioning method uses pilot tones of both sides in the frequency domain in the mid-zone, thereby obtaining a gain of reducing pilot overhead.

The pilot positioning method of diagram (D) of FIG. 7 uses Rule 3.

It is possible to reduce pilot overhead and obtain the same performance by using the pilot pattern with an irregular interval, applied in the existing single block, for all blocks, and reducing a PDR for the blocks located in the mid-zone. The reduction in the PDR herein indicates a relative reduction in the power assigned to the pilots.

Figure 9:
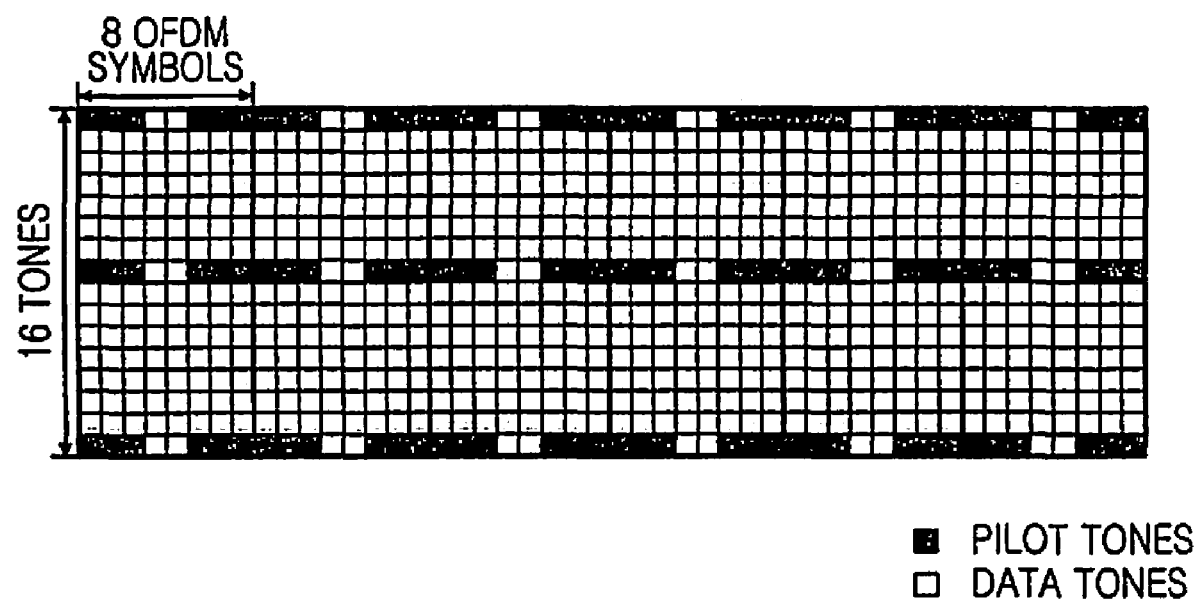
FIG. 9 is a diagram illustrating a pilot positioning method in an OFDMA mobile communication system in which several blocks are used in a time axis.

FIG. 9 is a diagram illustrating a pilot positioning method in an OFDMA mobile communication system in which several blocks are used in a time axis.

As to the problem of the conventional technology, when several blocks are assigned to one user in the time axis, the block located in the center can use channel information of its preceding/following blocks, causing excessive use of pilot tones for performance. To solve this problem, diagrams (a), (b) and (c) of FIG. 10 provide a method for reducing pilot tone overhead and obtaining the same performance by changing the pilot pattern.

Figure 10:
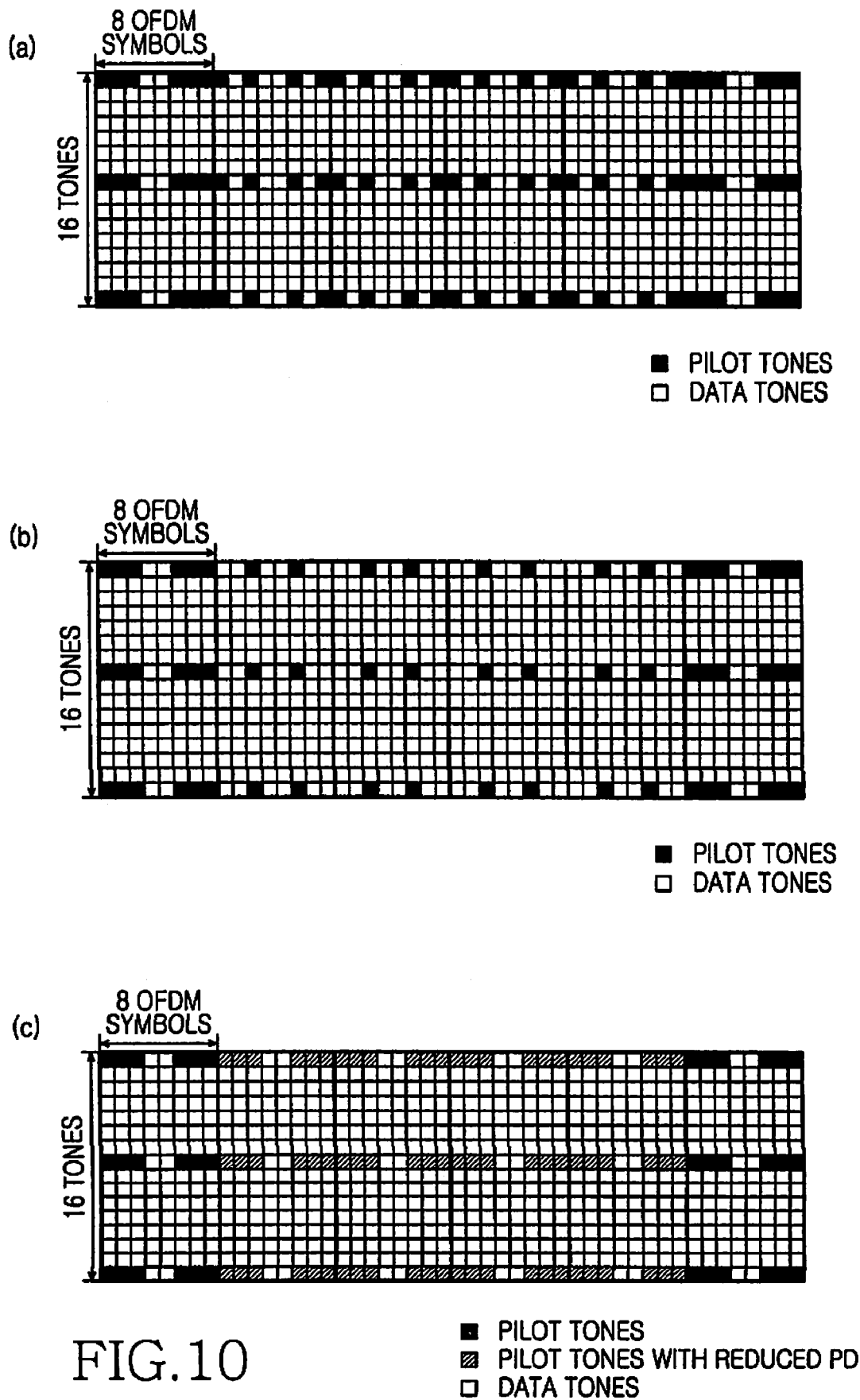
FIG. 10 is a diagram illustrating a pilot positioning method in an OFDMA mobile communication system according to a second embodiment of the present invention.

Diagrams (a) to (c) of FIG. 10 are diagrams illustrating a pilot positioning method in an OFDMA mobile communication system according to a second embodiment of the present invention.

The second embodiment of the present invention provides, as a method of reducing pilot overhead in the time axis, a technology capable of reducing the pilot overhead and obtaining the same performance by changing the pattern or reducing a PDR.

The second embodiment of the present invention uses the following rules when several blocks are used in the time axis.

Rule 1

(1) When several blocks are used in the time axis, the pilot pattern proposed for a single block is used for start and end blocks, as a pilot pattern of each block.

(2) The blocks located in the center among the several blocks undergo decimation in the time axis as shown in diagrams (a) and (b) of FIG. 10, thereby reducing the pilot overhead.

Rule 2

(1) When several blocks are used in the time axis, the proposed pilot pattern is used for start and end blocks, as a pilot pattern of each block.

(2) The blocks located in the center among the several blocks undergo a reduction in the PDR as shown in diagram (c) of FIG. 10, thereby reducing the pilot overhead.

In the pilot positioning method of diagram (a) of FIG. 10 to which Rule 1 is applied, the blocks of the first zone and mid-zone use channel information of both side blocks, thereby obtaining the same performance and reducing the number of pilot tones.

The pilot positioning method of diagram (b) of FIG. 10 to which Rule 1 is applied can further reduce the number of pilot tones in the blocks of the mid-zone, compared to the pilot positioning method of diagram (a) of FIG. 10.

The pilot positioning method of diagram (c) of FIG. 10 provides a method for reducing the pilot overhead in the time axis using Rule 2. In the method of diagram (c) of FIG. 10, the blocks located in the mid-zone use channel information of both side blocks, thereby obtaining the same performance and reducing the PDR without a change in the pilot pattern. The start and end blocks use the intact PDR of the existing pilot tone because they have no channel information before the start block and channel information after the end block.

Figure 11:
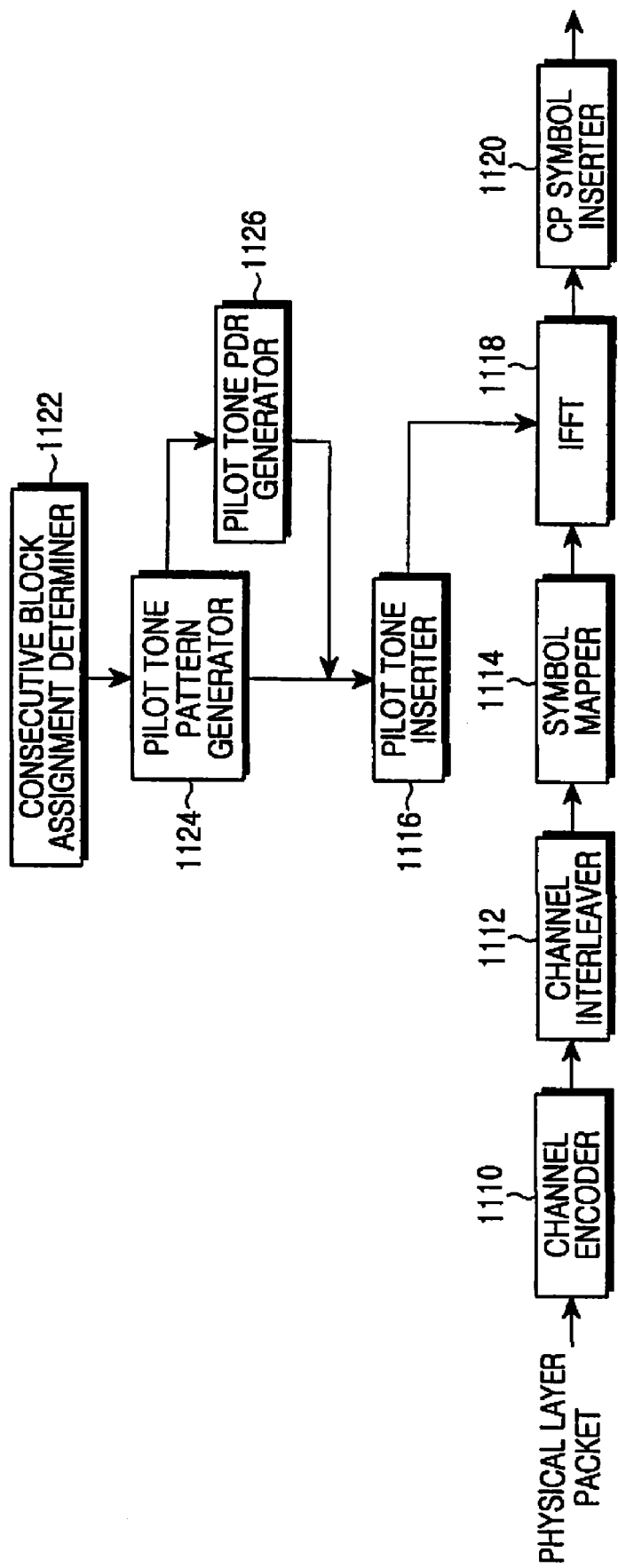
FIG. 11 is a diagram illustrating a structure of a transmitter for an OFDMA mobile communication system according to an embodiment of the present invention.

FIG. 11 is a diagram illustrating a structure of a transmitter for an OFDMA mobile communication system according to an embodiment of the present invention.

The transmitter includes a channel encoder 1110 for channel-encoding received packet data, a channel interleaver 1112 for interleaving the encoded packet data, a symbol mapper 1114 for modulating the interleaved packet data, a pilot tone inserter 1116 for pilot insertion, an IFFT unit 1118 for modulating data on the time axis, and a CP symbol inserter 1120 for preventing inter-symbol interference.

The transmitter further includes a consecutive block assignment determiner 1122, a pilot tone pattern generator 1124, and a pilot tone PDR generator 1126.

Physical layer packet data is channel-encoded in the channel encoder 1110, and the channel-encoded bit stream is interleaved by the channel interleaver 1112 to acquire diversity gain. The interleaved bit stream is converted to a desired modulation level in the symbol mapper 1114. For channel estimation at a receiver, the pilots generated from the pilot tone pattern generator 1124 and the pilot tone PDR generator 1126 are inserted between the modulation data and transferred to the IFFT unit 1118.

The consecutive block assignment determiner 1122 determines whether the resource block to be assigned to the receiver is a consecutive block or a single block, and provides the resulting information to the pilot tone pattern generator 1124. If the block to be assigned is a single block, the pilot tone pattern generator 1124 applies the pilot pattern shown in FIG. 4 in one block, and when assigning two or more consecutive blocks for adjacent blocks, the pilot tone pattern generator 1124 applies the pilot pattern shown in diagrams (A) to (D) of FIG. 7 for the several blocks. In addition, the pilot tone pattern generator 1124 determines pilot positioning according to whether it will position pilots at regular intervals (e.g. as in diagram (B) of FIG. 7), whether it will position pilots at irregular intervals only in the first and last blocks (e.g. as in diagram (C) of FIG. 7), and whether it will position pilots at irregular intervals in all blocks (e.g. as in diagram (D) of FIG. 7). The pilot pattern generated by the pilot tone pattern generator 1124 is transferred to the pilot tone inserter 1116 and the pilot tone PDR generator 1126.

The pilot and the data are different from each other in terms of the power assigned thereto. Therefore, a power ratio of the pilot to the data is predetermined in the transmitter and receiver. The pilot tone PDR generator 1126 adjusts a power ratio to be assigned to the pilot and the data according to the pilot tone positioning determined by the pilot tone pattern generator 1124. That is, the pilot tone PDR generator 1126 adjusts the PDR such that it can use an initial PDR for the pilot tone pattern shown in diagrams (B) and (C) of FIG. 7, and use a decreased PDR for the pilot tone pattern shown in diagram (D) of FIG. 7.

The pilot tone inserter 1116 inserts the pilots generated by the pilot tone pattern generator 1124 and the pilot tone PDR generator 1126 into a modulation signal, and transfers the resulting signal to the IFFT unit 1118.

Figure 12:
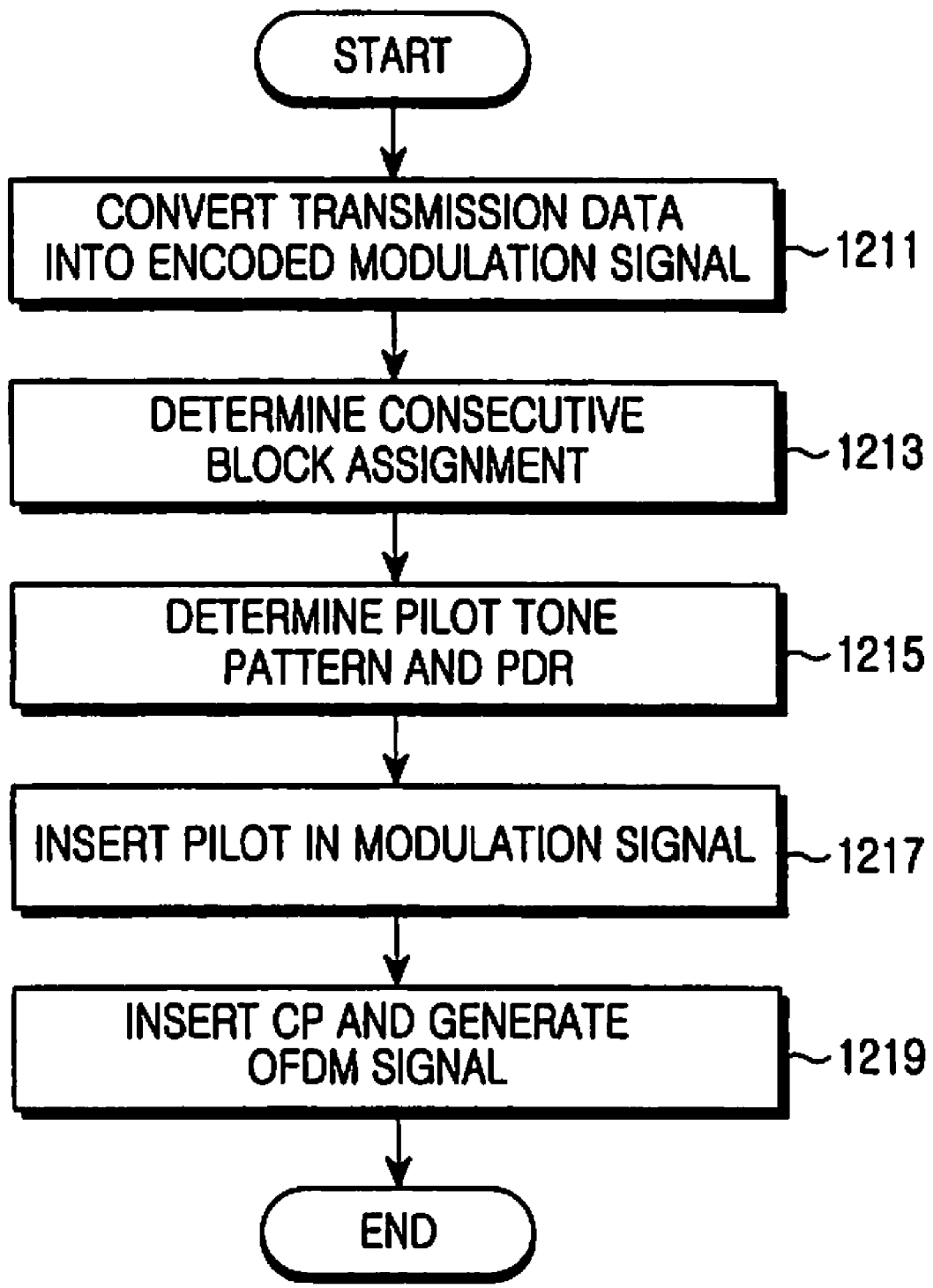
FIG. 12 is a flowchart illustrating an operation of a transmitter based on a pilot pattern and a PDR in an OFDMA mobile communication system according to an embodiment of the present invention.

FIG. 12 is a flowchart illustrating an operation of a transmitter based on a pilot pattern and a PDR in an OFDMA mobile communication system according to an embodiment of the present invention.

In step 1211, the transmitter converts transmission data into an encoded modulation signal. In step 1213, the consecutive block assignment determiner 1122 of the transmitter determines whether it will assign consecutive blocks or a single block on the frequency axis or time axis. Thereafter, in step 1215, the pilot tone pattern generator 1124 determines pilot tone positioning by applying the first and second embodiments of the present invention to generate pilots to be inserted into a modulation signal, and the pilot tone PDR generator 1126 adjusts a power ratio to be assigned to the pilot and the data according to the determined pilot tone positioning.

After generating the pilots in this process, the pilot tone inserter 1116 of the transmitter inserts the pilots into the modulation signal in step 1217, and the CP symbol inserter 1120 additionally inserts CP symbols therein in step 1219. In this manner, the transmitter generates and transmits an OFDM signal.

Figure 13:
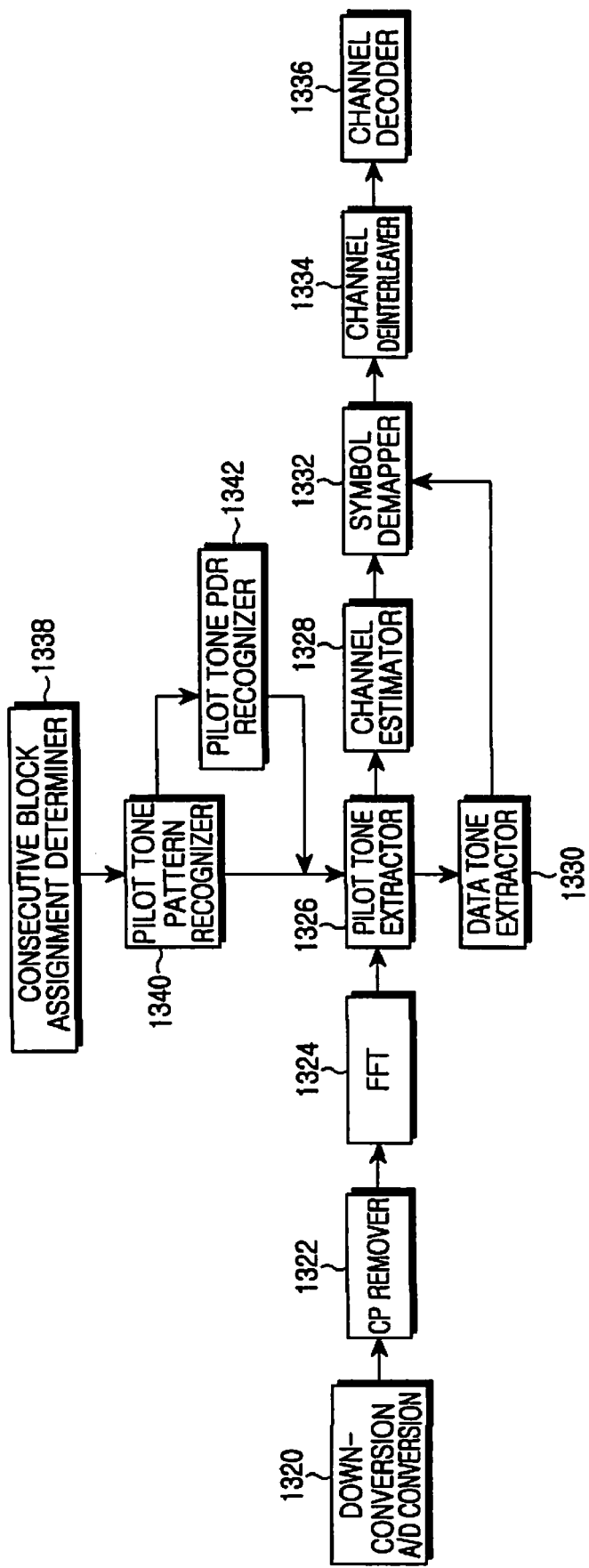
FIG. 13 is a diagram illustrating a structure of a receiver for an OFDMA mobile communication system according to an embodiment of the present invention.

FIG. 13 is a diagram illustrating a structure of a receiver for an OFDMA mobile communication system according to an embodiment of the present invention.

Referring to FIG. 13, a down-conversion and Analog-to-Digital (A/D) conversion unit 1320 converts a signal received over a radio network into a baseband signal, and converts the analog baseband signal into a digital signal. The converted digital signal is transferred to a CP remover 1322, and the CP remover 1322 removes from the received signal a CP the has been contaminated due to the propagation delay and multiple paths. An FFT processor 1324 converts an input time-domain signal into a frequency-domain signal.

A pilot tone extractor 1326 extracts pilot tones from tones of each signal, and transfers the extracted pilot tones to a channel estimator 1328, and transfers the remaining tones a data tone extractor 1330. The data tone extractor 1330 extracts data tones to from tones of the input signal, and sends the extracted data tones to a symbol demapper 1332.

The channel estimator 1328 estimates a channel using the pilot tones, and transfers the channel estimation result value to the symbol demapper 1332. The symbol demapper 1332 performs demodulation on the data tones received from the data tone extra 1330 using the channel estimation result value provided from the channel estimator 1328, and inputs the demodulated signal to a channel deinterleaver 1334. The channel deinterleaver 1334 deinterleaves the demodulated signal and outputs the resulting signal to a channel decoder 1336. The channel decoder 1336 decodes the input signal to restore the transmission signal.

A consecutive block assignment determiner 1338 determines whether the received block is a consecutive block or a single block.

A pilot tone pattern recognizer 1340 recognizes pilot pattern information in the pilot pattern shown in diagrams (A) to (D) of FIG. 7 if the received block is a consecutive block, and recognizes pilot pattern information in the pilot pattern shown in FIG. 4 if the received block is a single block. Thereafter, the pilot tone pattern recognizer 1340 outputs the recognized pilot pattern information to both the pilot tone extractor 1326 and a pilot tone PDR recognizer 1342.

For a consecutive block, the pilot tone PDR recognizer 1342 recognizes PDR information in the pilot pattern shown in diagrams (A) to (D) of FIG. 7, and for a single block, the pilot tone PDR recognizer 1342 recognizes PDR information in the pilot pattern shown in FIG. 4, and then outputs the recognized PDR information to the pilot tone extractor 1326.

Alternatively, the receiver can be constructed such that the output of the pilot tone PDR recognizer 1342 is not output to the pilot tone extractor 1326, but output to the channel estimator 1328, and the PDR information of the pilot tones are used for channel estimation.

The pilot tone extractor 1326 extracts pilot tones using the information obtained from the pilot tone pattern recognizer 1340 and the pilot tone PDR recognizer 1342 according to the consecutive block assignment determination.

Figure 14:
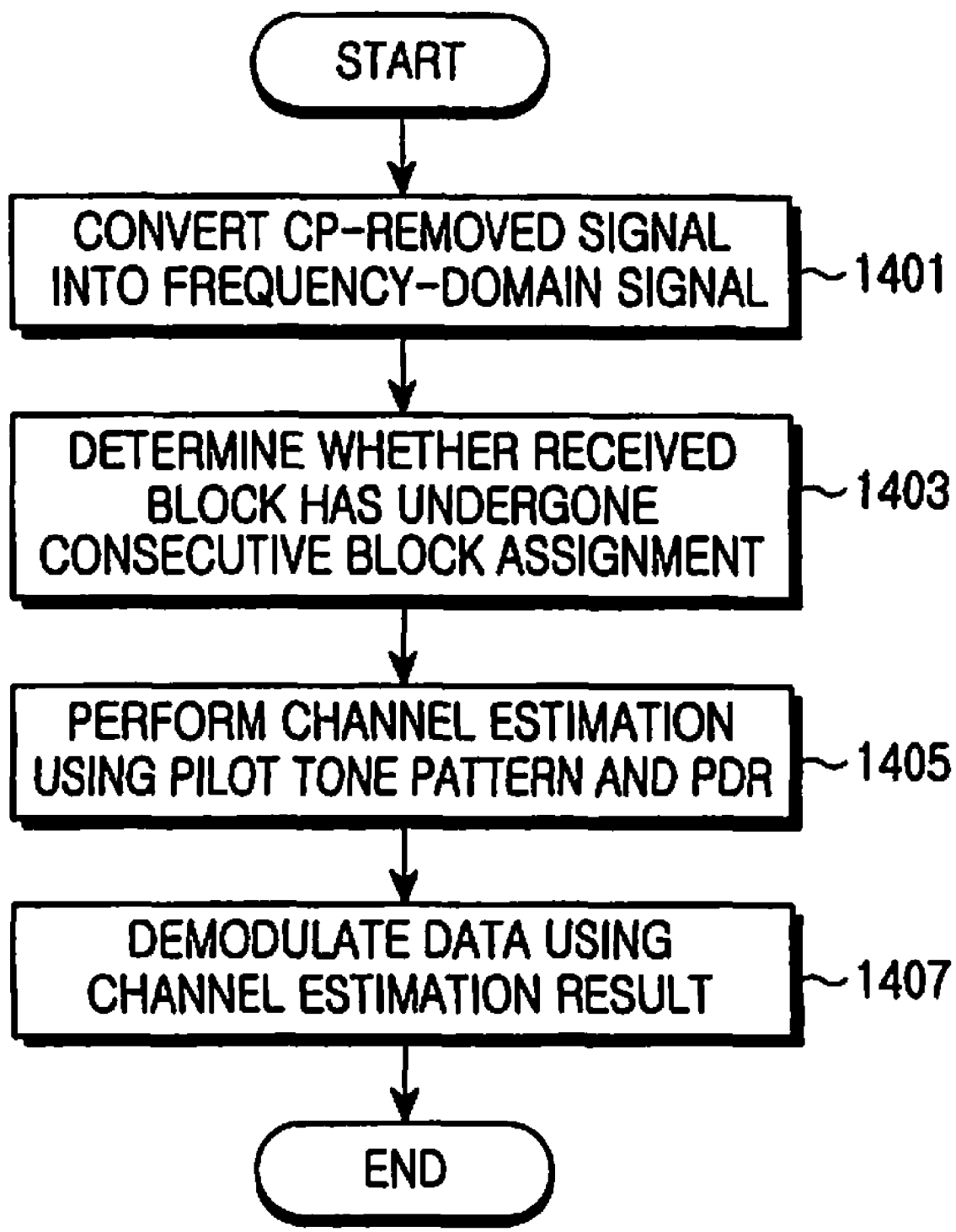
FIG. 14 is a flowchart illustrating a process of demodulating data symbols using a pilot pattern and a PDR in a receiver for an OFDMA mobile communication system according to an embodiment of the present invention.

FIG. 14 is a flowchart illustrating a process of demodulating data symbols using a pilot pattern and a PDR in a receiver for an OFDMA mobile communication system according to an embodiment of the present invention.

In step 1401, the CP remover 1322 of the receiver removes a CP from a signal received from a transmitter, and the FFT processor 1324 converts the CP-removed signal into a frequency-domain signal. In step 1403, the consecutive block assignment determiner 1338 of the receiver determines if a received block has undergone consecutive block assignment. In step 1405, the channel estimator 1328 performs channel estimation using the pilot tone pattern and the PDR. In step 1407, the symbol demapper 1332 of the receiver demodulates data using the channel estimation result value.

As is apparent from the foregoing description, the present invention sets an irregular interval between pilot symbols in one block to transmit pilot symbols over the frequency tones located at both ends of a block in an OFDMA mobile communication system, thereby removing the necessity to perform extrapolation upper level interpolation. As a result, the present invention can reduce the maximum MSE in the OFDMA mobile communication system, contributing to improvement of the estimation performance.

In addition, the present invention can reduce the overhead of pilot symbols by reducing a portion or power occupied by pilot symbols in a block when consecutive blocks on the time axis or frequency axis are assigned to one user in an OFDMA mobile communication system.

Further, the present invention can reduce the overhead of pilot symbols by reducing a portion or power occupied by pilot symbols in a block when a single block on the time axis or frequency axis is assigned to one user in an OFDMA mobile communication system.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for positioning a pilot in a transmitter for an Orthogonal Frequency Division Multiple Access (OFDMA) mobile communication system, the method comprising:

identifying, by a block assignment determiner, whether a consecutive block or a single block is assigned in a frequency axis or a time axis;

determining, by a pilot tone pattern generator, a pilot pattern in the block by applying a predetermined rule according to a result of the identifying; and positioning, by a pilot tone inserter, pilots in the block based on the determined pilot pattern, wherein the predetermined rule defines that a pilot pattern of at least one of a plurality of blocks comprising the consecutive block is different from that of the single block.

2. The method of claim 1, further comprising:
determining a Pilot-to-Data Ratio (PDR) according to the result of the identifying result.

3. The method of claim 1, wherein when a consecutive block is assigned in the frequency axis, the predetermined rule comprises:
determining an interval between pilots in the frequency axis as a number that can be obtained by dividing a number of frequency tones in one block, positioning pilots in all blocks at the determined pilot interval, and positioning pilot symbols in frequency tones of an end of a last block.

4. The method of claim 1, wherein when a consecutive block is assigned in the frequency axis, the predetermined rule comprises:
maintaining a pilot pattern used for a single block in a start block and an end block, and positioning pilot symbols at a regular interval in a mid-block.

5. The method of claim 1, wherein when a single block is assigned, the predetermined rule comprises:
positioning pilot symbols in a frequency domain at an irregular interval to transmit the pilot symbols over frequency tones located at a top and a bottom of one block.

6. The method of claim 1, wherein when a consecutive block is assigned in the time axis, the predetermined rule comprises:
using a pilot pattern of a single block for a start block and an end block, and performing decimation on mid-blocks except for the start block and the end block in the time axis, for pilot positioning.

7. A method for estimating a pilot in a receiver for an Orthogonal Frequency Division Multiple Access (OFDMA) mobile communication system, the method comprising:
identifying, by a block assignment determiner, whether an assigned block is a consecutive block or a single block in a frequency axis or a time axis;
determining, by a pilot tone pattern recognizer, a pilot pattern in the block to which a predetermined rule is applied according to a result of the identifying; and
extracting, by a pilot tone extractor, pilots using the determined pilot pattern,
wherein the predetermined rule defines that a pilot pattern of at least one of blocks comprising the consecutive block is different from that of the single block.

8. The method of claim 7, further comprising:
recognizing a Pilot-to-Data Ratio (PDR) according to the result of the identifying result.

9. The method of claim 7, wherein when the assigned block is a consecutive block in the frequency axis, the predetermined rule comprises:
determining an interval between pilots in the frequency axis as a number that can be obtained by dividing a number of frequency tones in one block, positioning pilots in all blocks at the determined pilot interval, and positioning pilot symbols in frequency tones of an end of a last block.

10. The method of claim 7, wherein when the assigned block is a consecutive block in the frequency axis, the predetermined rule comprises:
maintaining a pilot pattern used for a single block in a start block and an end block, and positioning pilot symbols at a regular interval in a mid-block.

11. The method of claim 7, wherein when the assigned block is a single block, the predetermined rule comprises:
positioning pilot symbols in a frequency domain at an irregular interval to transmit the pilot symbols over frequency tones located at a top and a bottom of one block.

12. The method of claim 7, wherein when the assigned block is a consecutive block in the time axis, the predetermined rule comprises:
using a pilot pattern of a single block for a start block and an end block, and performing decimation on mid-blocks except for the start block and the end block in the time axis, for pilot positioning.

13. An apparatus for positioning a pilot in a transmitter for an Orthogonal Frequency Division Multiple Access (OFDMA) mobile communication system, the apparatus comprising:
a block assignment determiner for determining whether a consecutive block or a single block is assigned in a frequency axis or a time axis;
a pilot tone pattern generator for determining a pilot pattern in the block by applying a predetermined rule according to a determination result of the block assignment determiner; and
a pilot tone inserter for positioning pilots in the block based on the determined pilot pattern,
wherein the predetermined rule defines that a pilot pattern of at least one of a plurality of blocks comprising the consecutive block is different from that of the single block.

14. The apparatus of claim 13, further comprising a pilot tone Pilot-to-Data Ratio (PDR) generator for determining a PDR according to the determination result of the block assignment determiner.

15. The apparatus of claim 13, wherein when a consecutive block is assigned in the frequency axis, the predetermined rule comprises:
determining an interval between pilots in the frequency axis as a number that can be obtained by dividing a number of frequency tones in one block, positioning pilots in all blocks at the determined pilot interval, and positioning pilot symbols in frequency tones of an end of a last block.

16. The apparatus of claim 13, wherein when a consecutive block is assigned in the frequency axis, the predetermined rule comprises:
maintaining a pilot pattern used for a single block in a start block and an end block, and positioning pilot symbols at a regular interval in a mid-block.

17. The apparatus of claim 13, wherein when a single block is assigned, the predetermined rule comprises:
positioning pilot symbols in a frequency domain at an irregular interval to transmit the pilot symbols over frequency tones located at a top and a bottom of one block.

18. The apparatus of claim 13, wherein when a consecutive block is assigned in the time axis, the predetermined rule comprises:
using a pilot pattern of a single block for a start block and an end block, and performing decimation on mid-blocks except for the start block and the end block in the time axis, for pilot positioning.

19. An apparatus for estimating a pilot in a receiver for an Orthogonal Frequency Division Multiple Access (OFDMA) mobile communication system, the apparatus comprising:
a block assignment determiner for identifying whether an assigned block is a consecutive block or a single block in a frequency axis or a time axis;
a pilot tone pattern recognizer for determining a pilot pattern in the block to which a predetermined rule is applied according to a result of the identifying; and
a pilot tone extractor for extracting pilots using the determined pilot pattern, wherein the predetermined rule defines that a pilot pattern of at least one of blocks comprising the consecutive block is different from that of the single block.

20. The apparatus of claim 19, further comprising a pilot tone Pilot-to-Data Ratio (PDR) recognizer for recognizing a PDR according to the result of the identifying.

21. The apparatus of claim 20, wherein when the assigned block is a consecutive block in the time axis, the predetermined rule comprises:
using a pilot pattern of a single block for a start block and an end block, and performing decimation on mid-blocks except for the start block and the end block in the time axis, for pilot positioning.

22. The apparatus of claim 19, wherein when the assigned block is a consecutive block in the frequency axis, the predetermined rule comprises:
determining an interval between pilots in the frequency axis as a number that can be obtained by dividing a number of frequency tones in one block, positioning pilots in all blocks at the determined pilot interval, and positioning pilot symbols in frequency tones of an end of a last block.

23. The apparatus of claim 19, wherein when the assigned block is a consecutive block in the frequency axis, the predetermined rule comprises:
maintaining a pilot pattern used for a single block in a start block and an end block, and positioning pilot symbols at a regular interval in a mid-block.

24. The apparatus of claim 19, wherein when the assigned block is a single block, the predetermined rule comprises:
positioning pilot symbols in a frequency domain at an irregular interval to transmit the pilot symbols over frequency tones located at a top and a bottom of one block.

25. A method for positioning a pilot in a transmitter for an Orthogonal Frequency Division Multiple Access (OFDMA) mobile communication system, the method comprising:
identifying, by a block assignment determiner, whether a consecutive block or a single block is assigned in a frequency axis or a time axis;
determining, by a pilot tone pattern generator, a pilot pattern in the block by applying a predetermined rule according to a result of the identifying; and
positioning, by a pilot tone inserter, pilots in the block based on the determined pilot pattern,
wherein when a consecutive block is assigned in the frequency axis or the time axis, the predetermined rule comprises:
maintaining a pilot pattern used for a single block for all blocks, and decreasing a Pilot-to-Data Ratio (PDR) for mid-blocks in the frequency axis or the time axis for pilot positioning.

26. A method for estimating a pilot in a receiver for an Orthogonal Frequency Division Multiple Access (OFDMA) mobile communication system, the method comprising:
identifying, by a block assignment determiner, whether an assigned block is a consecutive block or a single block in a frequency axis or a time axis;
determining, by a pilot tone pattern recognizer, a pilot pattern in the block to which a predetermined rule is applied according to a result of the identifying; and
extracting, by a pilot tone extractor, pilots using the determined pilot pattern,
wherein when the assigned block is a consecutive block in the frequency axis or the time axis, the predetermined rule comprises:
maintaining a pilot pattern used for a single block for all blocks, and decreasing a Pilot-to-Data Ratio (PDR) for mid-blocks in the frequency axis or time axis for pilot positioning.

27. An apparatus for positioning a pilot in a transmitter for an Orthogonal Frequency Division Multiple Access (OFDMA) mobile communication system, the apparatus comprising:
a block assignment determiner for determining whether a consecutive block or a single block is assigned in a frequency axis or a time axis;
a pilot tone pattern generator for determining a pilot pattern in the block by applying a predetermined rule according to a determination result of the block assignment determiner; and
a pilot tone inserter for positioning pilots in the block based on the determined pilot pattern,
wherein when a consecutive block is assigned in the frequency axis or time axis, the predetermined rule comprises:
maintaining a pilot pattern used for a single block for all blocks, and decreasing a Pilot-to-Data Ratio (PDR) for mid-blocks in the frequency axis or the time axis for pilot positioning.

28. An apparatus for estimating a pilot in a receiver for an Orthogonal Frequency Division Multiple Access (OFDMA) mobile communication system, the apparatus comprising:
a block assignment determiner for identifying whether an assigned block is a consecutive block or a single block in a frequency axis or a time axis;
a pilot tone pattern recognizer for determining a pilot pattern in the block to which a predetermined rule is applied according to a result of the identifying; and
a pilot tone extractor for extracting pilots using the determined pilot pattern,
wherein when the assigned block is a consecutive block in the frequency axis or time axis, the predetermined rule comprises:
maintaining a pilot pattern used for a single block for all blocks, and decreasing a PDR for mid-blocks in the frequency axis or time axis for pilot positioning.

* * * * *